United States Patent
Agrawal et al.

(10) Patent No.: US 12,551,784 B2
(45) Date of Patent: Feb. 17, 2026

(54) TACTILE OVERLAY FOR TOUCH SCREEN VIRTUAL GAME CONTROLLER COUPLED TO EXTERNAL DISPLAY

(71) Applicant: MOTOROLA MOBILITY LLC, Wilmington, DE (US)

(72) Inventors: Amit Kumar Agrawal, Bangalore (IN); Pankaj Kushwaha, Bangalore (IN); Satyabrata Rout, Bhubaneswar (IN)

(73) Assignee: Motorola Mobility LLC, Chicago, IL (US)

( * ) Notice: Subject to any disclaimer, the term of this patent is extended or adjusted under 35 U.S.C. 154(b) by 384 days.

(21) Appl. No.: 18/184,087

(22) Filed: Mar. 15, 2023

(65) Prior Publication Data

US 2024/0307761 A1    Sep. 19, 2024

(51) Int. Cl.
| | |
|---|---|
| *A63F 13/23* | (2014.01) |
| *A63F 13/2145* | (2014.01) |
| *A63F 13/24* | (2014.01) |
| *A63F 13/26* | (2014.01) |
| *G06F 3/01* | (2006.01) |
| *G06F 3/041* | (2006.01) |
| *G06F 3/044* | (2006.01) |

(52) U.S. Cl.
CPC .......... *A63F 13/23* (2014.09); *A63F 13/2145* (2014.09); *A63F 13/24* (2014.09); *A63F 13/26* (2014.09); *G06F 3/016* (2013.01); *G06F 3/0416* (2013.01); *G06F 3/044* (2013.01)

(58) Field of Classification Search
CPC ...... A63F 13/23; A63F 13/2145; A63F 13/24; A63F 13/26
See application file for complete search history.

(56) References Cited

U.S. PATENT DOCUMENTS

| | | | |
|---|---|---|---|
| 6,667,738 B2 * | 12/2003 | Murphy ................ | G06F 1/1626 345/173 |
| 6,903,662 B2 * | 6/2005 | Rix ........................ | G06F 3/0238 341/20 |
| 8,274,484 B2 * | 9/2012 | Baudisch ............ | G06F 3/04883 345/173 |
| 8,368,662 B2 * | 2/2013 | Argiro ................ | G06F 3/04886 345/169 |

(Continued)

*Primary Examiner* — Chase E Leichliter
(74) *Attorney, Agent, or Firm* — Isidore PLLC (57) ABSTRACT

An electronic device, method, and computer program product combine the mobility and flexibility of presenting a virtual gamepad on a touch display with tactile feedback associated with physical gamepad controllers. The electronic device connects to an external display. A controller of the electronic device executes a game application to present, via the external display, a game screen. The controller detects a first display cover configured to overlay a touch display of the electronic device and having raised contour(s). The controller identifies a virtual gamepad configuration having virtual control(s) associated with the game application. The controller presents the virtual gamepad configuration on the touch display. The raised contour of the display cover is positioned to provide tactile feedback to guide interaction with the virtual control(s). Identification and/or orientation of the virtual gamepad configuration is based at least in part on detecting the display cover.

20 Claims, 7 Drawing Sheets

(56) References Cited

U.S. PATENT DOCUMENTS

| | | | | |
|---|---|---|---|---|
| 8,558,796 | B2* | 10/2013 | Giancarlo | G06F 1/1662 345/169 |
| 8,698,764 | B1* | 4/2014 | Karakotsios | G06F 3/0488 345/173 |
| 8,810,524 | B1* | 8/2014 | Rosenberg | G06F 1/1692 345/1.3 |
| 9,092,058 | B2* | 7/2015 | Kasahara | G06F 3/04883 |
| 9,158,390 | B2* | 10/2015 | Petersen | A63F 13/2145 |
| 9,174,131 | B2* | 11/2015 | Shirasaka | A63F 13/822 |
| 9,281,859 | B1* | 3/2016 | Lee | A63F 13/98 |
| 9,317,197 | B2* | 4/2016 | Takuma | G06F 3/04883 |
| 9,519,419 | B2* | 12/2016 | Hinckley | G06F 3/041 |
| 9,652,773 | B1* | 5/2017 | Dublin, III | G02F 1/1336 |
| 9,891,743 | B2* | 2/2018 | Yanagawa | G06F 3/041 |
| 9,965,116 | B1* | 5/2018 | Wolter | G07G 1/01 |
| 10,042,480 | B2* | 8/2018 | Krahenbuhl | G06F 3/046 |
| 10,254,924 | B2* | 4/2019 | Missig | G06F 3/0488 |
| 11,534,681 | B2* | 12/2022 | Dang | A63F 13/5255 |
| 11,607,605 | B1* | 3/2023 | Garrett | A63F 13/24 |
| 12,399,615 | B2* | 8/2025 | Peng | A63F 13/22 |
| 2003/0235452 | A1* | 12/2003 | Kraus | G06F 3/0224 400/472 |
| 2004/0056781 | A1* | 3/2004 | Rix | G06F 3/0202 341/20 |
| 2006/0256090 | A1* | 11/2006 | Huppi | A63F 13/92 345/173 |
| 2007/0291008 | A1* | 12/2007 | Wigdor | G06F 1/1643 345/173 |
| 2008/0158183 | A1* | 7/2008 | Hotelling | G06F 3/04164 345/173 |
| 2010/0013777 | A1* | 1/2010 | Baudisch | G06F 3/04812 345/173 |
| 2010/0026646 | A1* | 2/2010 | Xiao | G06F 1/1626 345/173 |
| 2010/0194705 | A1* | 8/2010 | Kim | G06F 3/0488 345/173 |
| 2010/0259498 | A1* | 10/2010 | Harison | G06F 3/0224 715/702 |
| 2011/0009195 | A1* | 1/2011 | Porwal | A63F 13/533 463/37 |
| 2011/0094098 | A1* | 4/2011 | Hamblin | G06F 3/04166 29/846 |
| 2011/0163986 | A1* | 7/2011 | Lee | H04M 1/72427 345/173 |
| 2011/0172013 | A1* | 7/2011 | Shirasaka | A63F 13/92 345/173 |
| 2011/0241999 | A1* | 10/2011 | Thier | G06F 3/023 345/168 |
| 2011/0272260 | A1* | 11/2011 | Wallace | H03K 17/975 200/300 |
| 2011/0300934 | A1* | 12/2011 | Toy | A63F 13/2145 463/31 |
| 2012/0007809 | A1* | 1/2012 | Mahalingam | G06F 3/04886 345/173 |
| 2012/0188185 | A1* | 7/2012 | Cassar | G06F 3/0481 345/173 |
| 2012/0220372 | A1* | 8/2012 | Cheung | A63F 13/22 463/37 |
| 2013/0057487 | A1* | 3/2013 | Yamanaka | G06F 1/169 345/173 |
| 2013/0079139 | A1* | 3/2013 | Gray | G06F 3/04886 345/173 |
| 2013/0154958 | A1* | 6/2013 | Clavin | G06F 1/1632 345/173 |
| 2013/0165180 | A1* | 6/2013 | Fukuda Kelley | G05B 19/02 340/870.3 |
| 2013/0181902 | A1* | 7/2013 | Hinckley | G06F 3/041 345/173 |
| 2013/0222238 | A1* | 8/2013 | Sliger | G06F 3/04886 345/157 |
| 2013/0249830 | A1* | 9/2013 | Quek | G06F 3/0393 345/173 |
| 2013/0278624 | A1* | 10/2013 | Abe | G09G 5/363 345/619 |
| 2013/0321287 | A1* | 12/2013 | Adamson | G06F 1/3271 345/173 |
| 2013/0328792 | A1* | 12/2013 | Myers | G06F 1/1656 345/173 |
| 2014/0191980 | A1* | 7/2014 | Mulabagal | G06F 1/3287 345/173 |
| 2015/0103015 | A1* | 4/2015 | Berglund | H04N 21/4222 345/173 |
| 2015/0105152 | A1* | 4/2015 | Bellinghausen | A63F 13/2145 463/31 |
| 2015/0135145 | A1* | 5/2015 | Kamide | G06F 3/03547 715/863 |
| 2015/0182856 | A1* | 7/2015 | Mays, III | G06F 3/0488 463/31 |
| 2015/0293695 | A1* | 10/2015 | Schönleben | G06F 3/0412 345/173 |
| 2015/0317007 | A1* | 11/2015 | Yanagawa | G09G 3/20 345/173 |
| 2016/0089600 | A1* | 3/2016 | Mays, III | A63F 13/22 463/31 |
| 2016/0139723 | A1* | 5/2016 | Brett | G06F 3/0488 345/173 |
| 2016/0283063 | A1* | 9/2016 | Missig | G06F 3/1423 |
| 2016/0378226 | A1* | 12/2016 | McCarthy, III | A45C 11/00 224/576 |
| 2018/0252931 | A1* | 9/2018 | Kim-Whitty | G02B 30/34 |
| 2019/0134499 | A1* | 5/2019 | Lee | A63F 13/77 |
| 2020/0026387 | A1* | 1/2020 | Barel | G06F 3/0393 |
| 2020/0316458 | A1* | 10/2020 | Yoshino | G06F 1/169 |
| 2022/0096921 | A1* | 3/2022 | Nielsen | H04N 13/296 |
| 2022/0212096 | A1* | 7/2022 | Delaporte | G06F 1/1652 |
| 2022/0233950 | A1* | 7/2022 | Larson | A63F 13/98 |
| 2023/0068209 | A1* | 3/2023 | Han | A63F 13/2145 |
| 2023/0092439 | A1* | 3/2023 | Dang | A63F 13/35 463/37 |
| 2024/0176483 | A1* | 5/2024 | Peng | A63F 13/77 |
| 2024/0307761 | A1* | 9/2024 | Agrawal | A63F 13/24 |
| 2024/0325878 | A1* | 10/2024 | Poitrey | A63F 13/22 |
| 2025/0114691 | A1* | 4/2025 | Poitrey | A63F 13/211 |
| 2025/0153035 | A1* | 5/2025 | Torres | A63F 13/22 |
| 2025/0153045 | A1* | 5/2025 | O'Connor | A63F 13/22 |

* cited by examiner

TACTILE OVERLAY FOR TOUCH SCREEN VIRTUAL GAME CONTROLLER COUPLED TO EXTERNAL DISPLAY

BACKGROUND

1. Technical Field

The present disclosure relates generally to communication devices that have a touch screen, and in particular to communication devices that can concurrently present different content on an internal touch screen and an external display.

2. Description of the Related Art

User communication devices may be sized for mobility, enabling users to engage in audio as well as video communication sessions in nearly any location. Within a small handheld form factor, communication devices present sensors and output devices that can be used as a traditional phone handset with a speaker positioned to be used as an earpiece and a microphone positioned to capture audio inputs as spoken by a user. Some communication devices such as smartphones have become multi-functional devices as the designs have increasingly incorporated a large number of capabilities. In an example, rather than being limited to manually actuated control keys and buttons, touch screens are configurable to present visual content and graphical controls in support of many types of applications in addition to user communication sessions.

In a related technology, game consoles are widely used, combining a large external display monitor for an immersive experience with a physical gamepad controller that is ergonomically configured for two-handed use while looking at the monitor. When unable to use a stationary game console, gamers increasingly use mobile gaming even though the small screen and lack of ergonomic game controls limits the gaming experience. To better approximate playing on a game console, mobile communication devices are being configured to present a virtual gamepad controller while presenting a game screen on a larger external display monitor.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

According to aspects of the present disclosure, an electronic device, a method and a computer program product combine the mobility and flexibility of presenting a virtual gamepad on a touch display with passive tactile contours that provides touch feedback associated with physical gamepad controllers. The electronic device includes a touch display and a communication interface that enables the electronic device to connect to an external display. A first display cover is configured to overlay the touch display and has at least one raised contour. The electronic device includes a memory storing a first game application associated with a first game controller. A controller of the electronic device is communicatively connected to the external display, the touch display, and the memory. The controller executes the first game application to present, via the external display, a first game screen. The controller identifies a first virtual gamepad configuration including one or more virtual controls associated with the first game application. The controller presents the first virtual gamepad configuration on the touch display, where the at least one raised contour of the first display cover is positioned to provide tactile feedback to guide interaction with the at least one of the one or more virtual controls. In one or more embodiments, at least one of identification and orientation of the first virtual gamepad configuration is based, at least in part, on the controller detecting characteristic(s) of the first display cover via a sensor. In particular, the controller may detect identifying information for the first display cover that enables the controller to determine of one or more of: (i) presence of the first display cover; (ii) type of the first display cover associated with a corresponding virtual gamepad configuration; and (iii) orientation of the first display cover.

In the following detailed description of exemplary embodiments of the disclosure, specific exemplary embodiments in which the various aspects of the disclosure may be practiced are described in sufficient detail to enable those skilled in the art to practice the invention, and it is to be understood that other embodiments may be utilized and that logical, architectural, programmatic, mechanical, electrical, and other changes may be made without departing from the spirit or scope of the present disclosure. The following detailed description is, therefore, not to be taken in a limiting sense, and the scope of the present disclosure is defined by the appended claims and equivalents thereof. Within the descriptions of the different views of the figures, similar elements are provided similar names and reference numerals as those of the previous figure(s). The specific numerals assigned to the elements are provided solely to aid in the description and are not meant to imply any limitations (structural or functional or otherwise) on the described embodiment. It will be appreciated that for simplicity and clarity of illustration, elements illustrated in the figures have not necessarily been drawn to scale. For example, the dimensions of some of the elements are exaggerated relative to other elements.

It is understood that the use of specific component, device and/or parameter names, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that term is utilized.

As further described below, implementation of the functional features of the disclosure described herein is provided within processing devices and/or structures and can involve use of a combination of hardware, firmware, as well as several software-level constructs (e.g., program code and/or program instructions and/or pseudo-code) that execute to provide a specific utility for the device or a specific functional logic. The presented figures illustrate both hardware components and software and/or logic components.

Those of ordinary skill in the art will appreciate that the hardware components and basic configurations depicted in the figures may vary. The illustrative components are not intended to be exhaustive, but rather are representative to highlight essential components that are utilized to implement aspects of the described embodiments. For example, other devices/components may be used in addition to or in place of the hardware and/or firmware depicted. The depicted example is not meant to imply architectural or other limitations with respect to the presently described embodiments and/or the general invention. The description of the illustrative embodiments can be read in conjunction with the accompanying figures. Embodiments incorporating teachings of the present disclosure are shown and described with respect to the figures presented herein.

Figure 1:
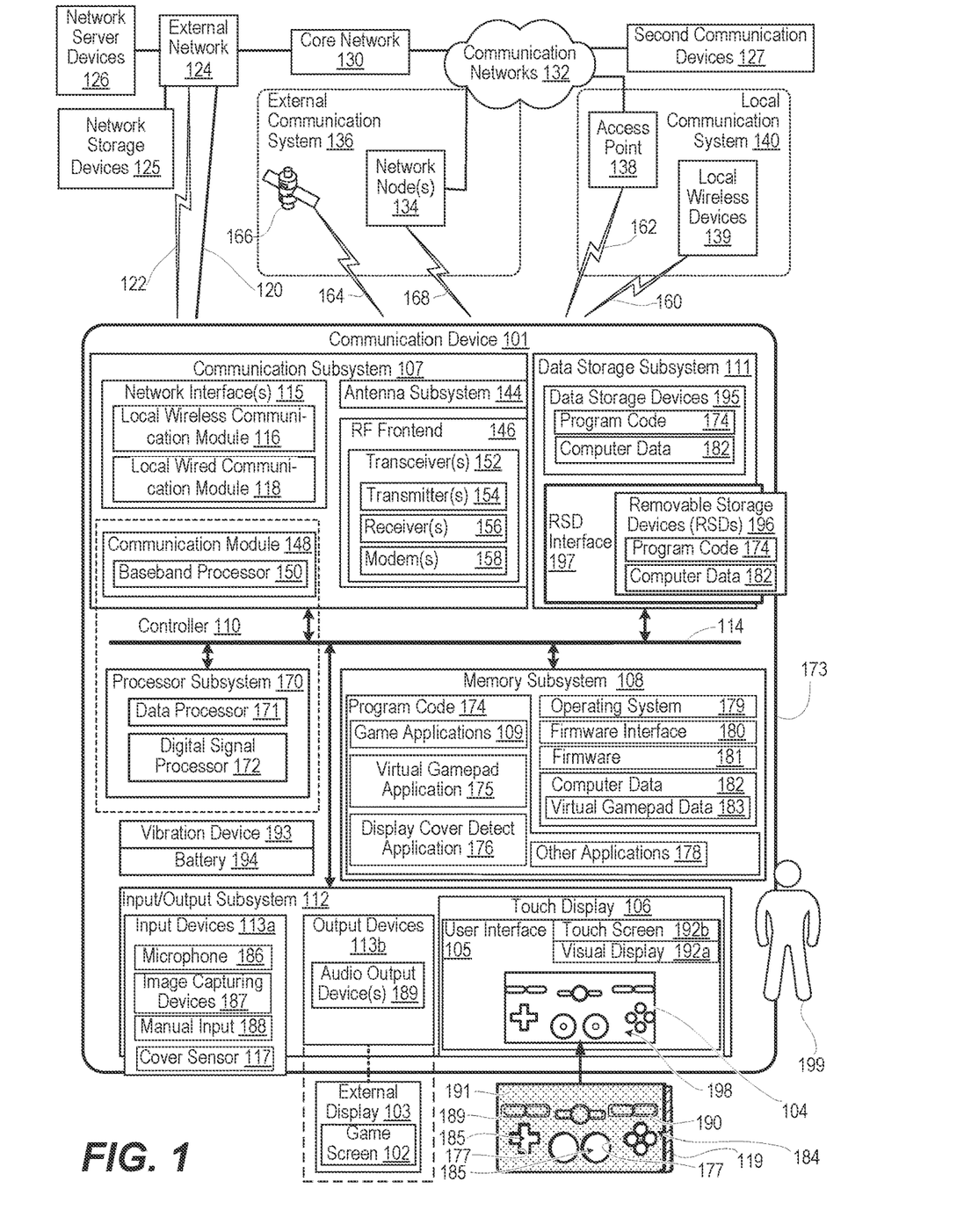
FIG. 1 depicts a functional block diagram of a communication environment including a communication device that supports mobile gaming by presenting a game screen on an external display while presenting a virtual gamepad on a touch display augmented with a display cover, according to one or more embodiments.

FIG. 1 is a functional block diagram of a communication environment 100 that includes an electronic device, which is referenced herein as communication device 101 and in which the features of the present disclosure are advantageously implemented. In particular, communication device 101 supports mobile gaming by presenting game screen 102 on external display 103 while presenting first virtual gamepad 104 on user interface 105 of touch display 106. Communication device 101 includes communication subsystem 107 that enables communication device 101 to connect to external display 103. Communication device 101 includes memory subsystem 108 storing game application 109. Input/output (I/O) subsystem 112 of communication device 101 includes cover sensor 117 configured to detect presence, type, and orientation of display cover 119. Controller 110 of communication device 101 is communicatively connected to external display 103, touch display 106, memory subsystem 108, and cover sensor 117.

Communication device 101 can be one of a host of different types of devices, including but not limited to, a mobile cellular phone, satellite phone, or smart phone, a laptop, a netbook, an ultra-book, a networked smartwatch or networked sports/exercise watch, and/or a tablet computing device or similar device that can include wireless communication functionality. As a device supporting wireless communication, communication device 101 can be utilized as, and also be referred to as, a system, device, subscriber unit, subscriber station, mobile station (MS), mobile, mobile device, remote station, remote terminal, user terminal, terminal, user agent, user device, a Session Initiation Protocol (SIP) phone, a wireless local loop (WLL) station, a personal digital assistant (PDA), computer workstation, a handheld device having wireless connection capability, a computing device, or other processing devices connected to a wireless modem.

Referring now to the specific component makeup and the associated functionality of the presented components. In addition to communications subsystem 107, memory subsystem 108, and controller 110, communication device 101 includes data storage subsystem 111, and I/O subsystem 112 having input devices 113a and output devices 113b. To enable management by controller 110, system interlink 114 communicatively connects controller 110 with communications subsystem 107, memory subsystem 108, data storage subsystem 111, and input/output subsystem 112. System interlink 114 represents internal components that facilitate internal communication by way of one or more shared or dedicated internal communication links, such as internal serial or parallel buses. As utilized herein, the term "communicatively coupled" means that information signals are transmissible through various interconnections, including wired and/or wireless links, between the components. The interconnections between the components can be direct interconnections that include conductive transmission media or may be indirect interconnections that include one or more intermediate electrical components. Although certain direct interconnections (i.e., system interlink 114) are illustrated in FIG. 1, it is to be understood that more, fewer, or different interconnections may be present in other embodiments.

In one or more embodiments, communications subsystem 107 may include one or more network interfaces 115, such as local wireless communication module 116 and local wired communication module 118, to communicatively couple communication device 101 via network cable 120 or wireless connection 122 to external networks 124. Communication device 101, via external networks 124, may connect to network storage devices 125 that store computer data and to network server devices 126 that facilitate access to network storage device 125. Network server devices 126 may have identical or similar components and functionality as described above for communication device 101. Communication device 101 may communicate with second communication devices 127 via external network 124 or via communication networks 132 that are supported by core networks 130. Network interface(s) 115 may include a network interface controller (NIC) and support one or more network communication protocols. External network 124 can be a local area network (LAN), a campus area network (CAN), a metropolitan area network (MAN), or a wide area network (WAN). For example, network cable 120 and wireless connection 122 can be an Ethernet connection/cable.

In one or more embodiments, communications subsystem 107 may include additional functionality for communicating, using a cellular connection, with network node(s) 134 of external communication system 136 and for communicating, using a wireless connection, with wireless access point 138 or local wireless devices 139 of local communication system 140. Communications subsystem 107 includes antenna subsystem 144. Communications subsystem 107 includes radio frequency (RF) front end 146 and communication module 148 having baseband processor 150. RF front end 146 includes transceiver(s) 152, which includes transmitter(s) 154 and receiver(s) 156. RF front end 146 further includes modem(s) 158. Baseband processor 150 of communication module 148 communicates with controller 110 and RF front end 146. Baseband processor 150 operates in a baseband frequency range to encode data for transmission and decode received data, according to a communication protocol. Modem(s) 158 modulates baseband encoded data from communication module 148 onto a carrier signal to provide a transmit signal that is amplified by transmitter(s) 154. Modem(s) 158 demodulates each signal received using antenna subsystem 144 from external communication system 136 or local communication system 140. The received signal is amplified and filtered by receiver(s) 156, which demodulates received encoded data from a received carrier signal.

In one or more embodiments, controller 110, via communications subsystem 107, performs multiple types of cellular over-the-air (OTA) or wireless communication with local communication system 140. Communications subsystem 107 can communicate via an OTA connection 160 with local wireless devices 139. In an example, OTA connection 160 is a Bluetooth connection, or other personal access network (PAN) connection. In one or more embodiments, communications subsystem 107 communicates with one or more locally networked devices via a wireless local area network (WLAN) link 162 supported by access point 138. In one or more embodiments, access point 138 supports communication using one or more IEEE 802.11 WLAN protocols. Access point 138 is connected to communication networks 132 via a cellular or wired connection. In one or more embodiments, communications subsystem 107 receives downlink channels 164 from GPS satellites 166 to obtain geospatial location information. Communications subsystem 107 can communicate via an over-the-air (OTA) cellular connection 168 with network node(s) 134.

Controller 110 includes processor subsystem 170, which includes one or more central processing units (CPUs), depicted as data processor 171. Processor subsystem 170 can include one or more digital signal processors 172 that can be integrated with data processor 171. Processor subsystem 170 can include other processors that are communicatively coupled to data processor 171, such as baseband processors 150 of communication module 148. In one or more embodiments that are not depicted, controller 110 can further include distributed processing and control components that are external to housing 173 or grouped with other components, such as I/O subsystem 112. Data processor 171 is communicatively coupled, via system interlink 114, to memory subsystem 108. In one or more embodiments, data processor 171 is communicatively coupled via system interlink 114 to communications subsystem 107, data storage subsystem 111 and I/O subsystem 112. Controller 110 manages, and in some instances directly controls, the various functions and/or operations of communication device 101. These functions and/or operations include, but are not limited to including, application data processing, communication with second communication devices, navigation tasks, image processing, and signal processing. In one or more alternate embodiments, communication device 101 may use hardware component equivalents for application data processing and signal processing. For example, communication device 101 may use special purpose hardware, dedicated processors, general purpose computers, microprocessor-based computers, micro-controllers, optical computers, analog computers, dedicated processors and/or dedicated hardwired logic.

Memory subsystem 108 stores program code 174 for execution by processor subsystem 170 to provide the functionality described herein. Program code 174 includes applications such as game applications 109, virtual gamepad application 175, display cover detection application 176, and other applications 178. In one or more embodiments, several of the described aspects of the present disclosure are provided via executable program code of applications executed by controller 110. In one or more embodiments, program code 174 may be integrated into a distinct chipset or hardware module as firmware that operates separately from executable program code. Portions of program code 174 may be incorporated into different hardware components that operate in a distributed or collaborative manner. Implementation of program code 174 may use any known mechanism or process for doing so using integrated hardware and/or software, as known by those skilled in the art. Memory subsystem 108 further includes operating system (OS) 179, firmware interface 180, such as basic input/output system (BIOS) or Uniform Extensible Firmware Interface (UEFI), and firmware 181.

Memory subsystem 108 includes computer data 182 such as virtual gamepad configuration data 183 used by game application 109 to interface with virtual gamepad 104, with virtual gamepad application 176 to identify virtual gamepad 104 that is compatible with game applications 109, and with display cover detect application 176 that matches virtual gamepad 104 with display cover 119. Computer data 182 may incorporate "data" that originated as raw, real-world "analog" information that consists of basic facts and figures. Computer data 182 includes different forms of data, such as numerical data, images, coding, notes, and financial data. The computer data may originate at communication device 101 or be retrieved by communication device 101. Communication device 101 may store, modify, present, or transmit computer data 182. Computer data may be organized in one of a number of different data structures. Common examples of computer data 182 include video, graphics, text, and images as discussed herein. Computer data 182 can also be in other forms of flat files, databases, and other data structures.

I/O subsystem 112 includes input devices 113a and output devices 113b. In addition to cover sensor 117, input devices 113a may include microphone 186, image capturing devices 187, and manual input devices 188 (e.g., keys and buttons). Output devices 113b may include audio output devices 189 in addition to external display 103 and touch display 106. I/O subsystem 112 may include haptic or tactile output devices such as vibration device 193 that oscillates a mass such as battery 194 to create vibratory alerts. Touch display 106 provides user interface 105 having visual display layer 192a as input device 113a below touch screen 192b as output device 113b.

Data storage subsystem 111 of communication device 101 includes data storage device(s) 195. Controller 110 is communicatively connected, via system interlink 114, to data storage device(s) 195. Data storage subsystem 111 provides program code 174 and computer data 182 stored on non-volatile storage that is accessible by controller 110. For example, data storage subsystem 111 can provide a selection of computer data 182 and applications, such as game applications 109, virtual gamepad application 175, display cover detect application 176, and other applications 178. These applications can be loaded into memory subsystem 108 for execution/processing by controller 110. In one or more embodiments, data storage device(s) 195 can include hard disk drives (HDDs), optical disk drives, and/or solid-state drives (SSDs), etc. Data storage subsystem 111 of communication device 101 can include removable storage device(s) (RSD(s)) 196, which is received in RSD interface 197. Controller 110 is communicatively connected to RSD 196, via system interlink 114 and RSD interface 197. In one or more embodiments, RSD 196 is a non-transitory computer program product or computer readable storage device. Controller 110 can access data storage device(s) 195 or RSD 196 to provision communication device 101 with program code, such as program code 174 for game applications 109, virtual gamepad application 175, display cover detection application 176, and other applications 178, and with computer data 182.

In one or more embodiments, controller 110 executes a first game application of the one or more game applications 109 to present, via external display 103, game screen 102. Controller 110 identifies a first virtual gamepad configuration in virtual gamepad data 183 having two or more virtual controls 198. Controller 110 presents the first virtual gamepad configuration as first virtual gamepad 104 on touch display 106. Display cover 119 may be placed over touch display 106 to enhance a game play experience by providing tactile feedback so that user 199 may focus attention on game screen 102 presented on external display 103. In particular, raised contours 184, such as hole edges 177, raised areas 190a, or depressed areas 190b of covering layer 191 of display cover 119 are positioned to provide passive tactile contours for touch feedback to guide interaction at virtual controls 198 while gazing at external display 103.

Figure 2:
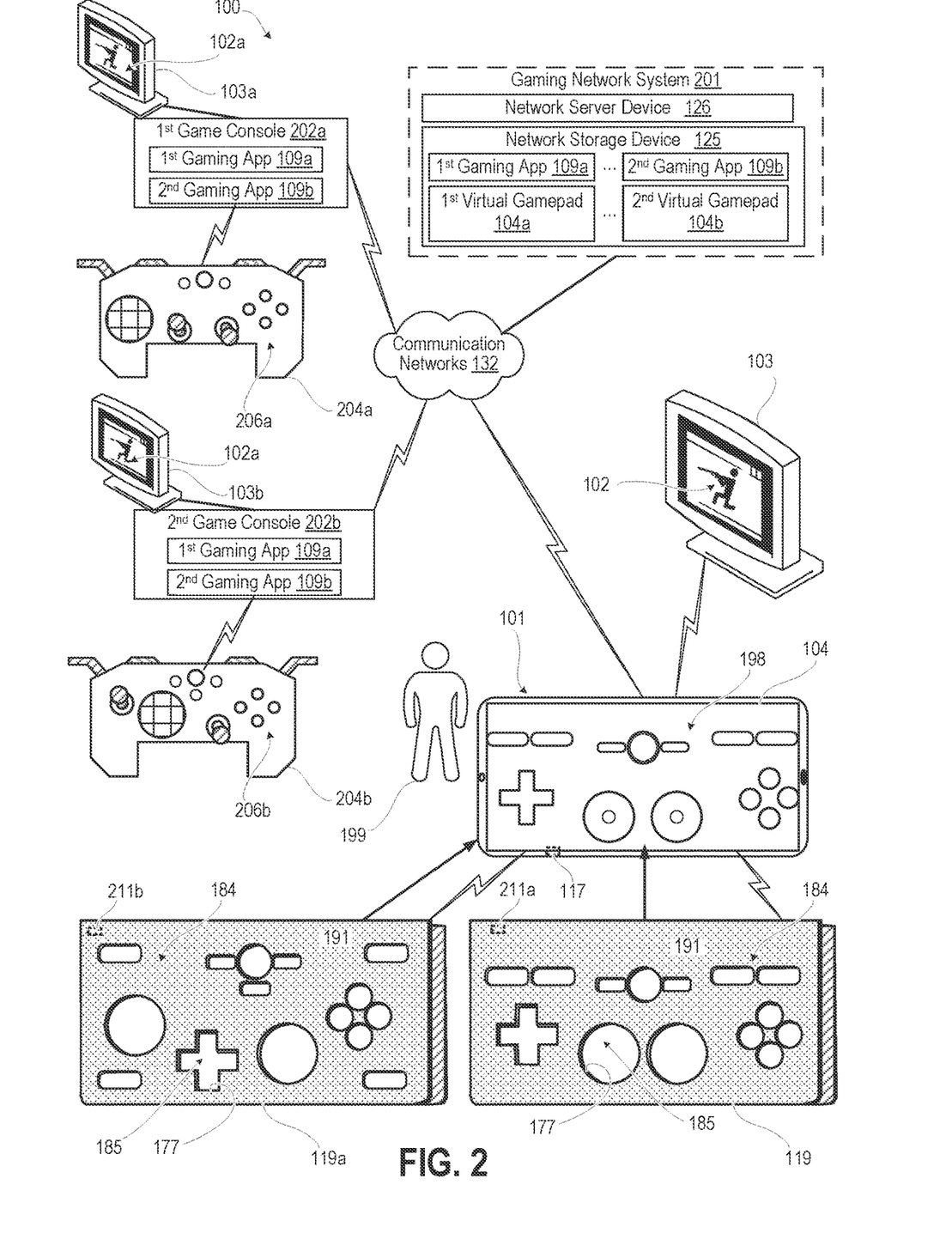
FIG. 2 depicts the communication environment including a gaming network system in communication with gaming consoles and the communication device of FIG. 1 that presents a first virtual gamepad that imitates controls of a first physical gamepad controller, according to one or more embodiments.

FIG. 2 depicts communication environment 100, which includes gaming network system 201 in communication with first and second gaming consoles 202a and 202b and communication device 101. First gaming console 202a is provisioned by gaming network system 201 with first game application 109a and second game application 109b. First physical gamepad controller 204a has first physical game controls 206a (e.g., joysticks, joypads, buttons, bumpers, triggers, etc.) in a first gamepad physical layout. User 199 uses first physical gamepad controller 204a to interact with first game console 202a. First game console 202a is executing first game application 109a and presenting first game screen 102a on second external display 103a. Similarly, second gaming console 202b is provisioned by gaming network system 201 with first game application 109a and second game application 109b. Second physical gamepad controller 204b has second physical game controls 206b (e.g., joysticks, joypads, buttons, bumpers, triggers, etc.) in a second gamepad physical layout. User 199 uses second physical gamepad controller 204b to interact with game console 202b. Second game console 202b is executing first game application 109a and presenting first game screen 102a on third external display 103b.

In one or more embodiments, gaming network system 201 supports communication device 101 for mobile gaming. Gaming network system 201 may have a distributed computing architecture such as a cloud service that includes more than one network storage device 125 and more than one network server device 126 (FIG. 2). Gaming network system 201 stores and distributes first and second game applications 109a and 109b. Gaming network system 201 may store and distribute one or more virtual gamepads 104 and 104a, such as to communication device 101 that is performing mobile gaming and presenting first game screen 102a on external display 103.

Being familiar with at least one of physical gamepad controllers 204a and 204b, user 199 may benefit from having a similar gaming experience when doing mobile gaming using communication device 101 to present virtual gamepad 104 on touch display 106 and game screen 102 on external display 103. In an example, user 199 is familiar with first physical gamepad controller 204a and selects to use corresponding first virtual gamepad 104a that simulates the full functionality of first physical game controls 206a. Display cover 119 includes raised contours 184, such as hole edges 177 formed in covering layer 191 around holes 185 that are positioned to provide tactile feedback for virtual controls 198 that simulate first physical gamepad controller 204a. Alternatively, user 199 may prefer second physical game controller 204b, or the game being played dictates use of a different set of virtual controls 198 that are provided by second virtual gamepad 104b. Second display cover 119a includes raised contours 184, such as hole edges 177 around holes 185 formed in covering layer 191 that are positioned to provide tactile feedback for virtual controls 198 that simulate second physical gamepad controller 204b. Each display cover 119a and 119b include respective passive or active target identification components 211a and 211b that indicate to cover sensor 117 of communication device 101 the presence, type, and orientation of corresponding display cover 119a and 119b. In an example, cover sensor 117 uses ultra-wideband (UWB) radio technology to detect identification components 211a and 211b that are UWB devices.

UWB devices can use a very low energy level for short-range, high-bandwidth communications over a large portion of the radio spectrum. UWB has traditional applications in non-cooperative radar imaging. Most recent applications target sensor data collection, precise locating, and tracking. Ultra-wideband is a technology for transmitting information across a wide bandwidth (>500 MHZ). This allows for the transmission of a large amount of signal energy without interfering with conventional narrowband and carrier wave transmission in the same frequency band. Regulatory limits in many countries allow for this efficient use of radio bandwidth and enable high-data-rate personal area network (PAN) wireless connectivity, longer-range low-data-rate applications, and the transparent co-existence of radar and imaging systems with existing communications systems.

Figure 3A:
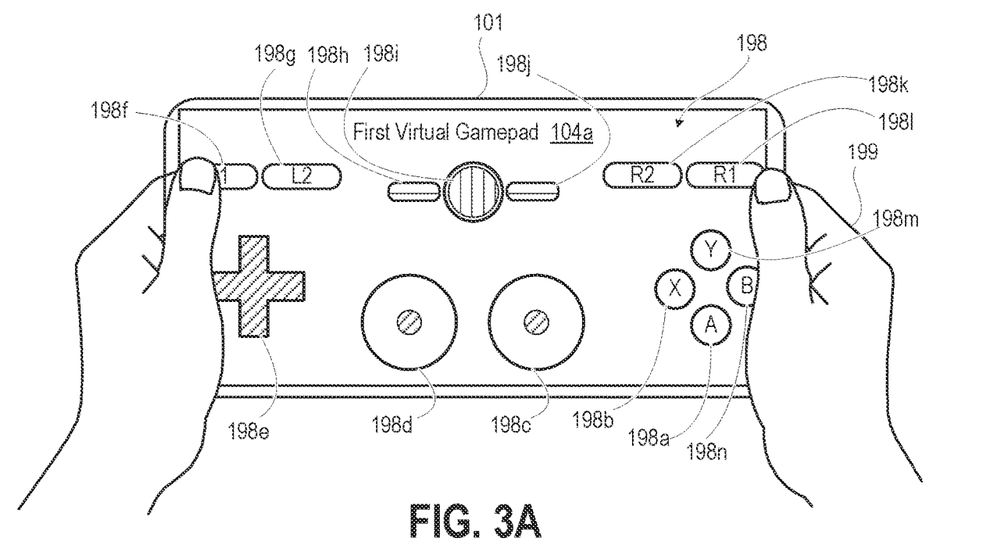
FIG. 3A depicts the communication device of FIG. 2 presenting the first virtual gamepad, according to one or more embodiments.
Figure 3B:
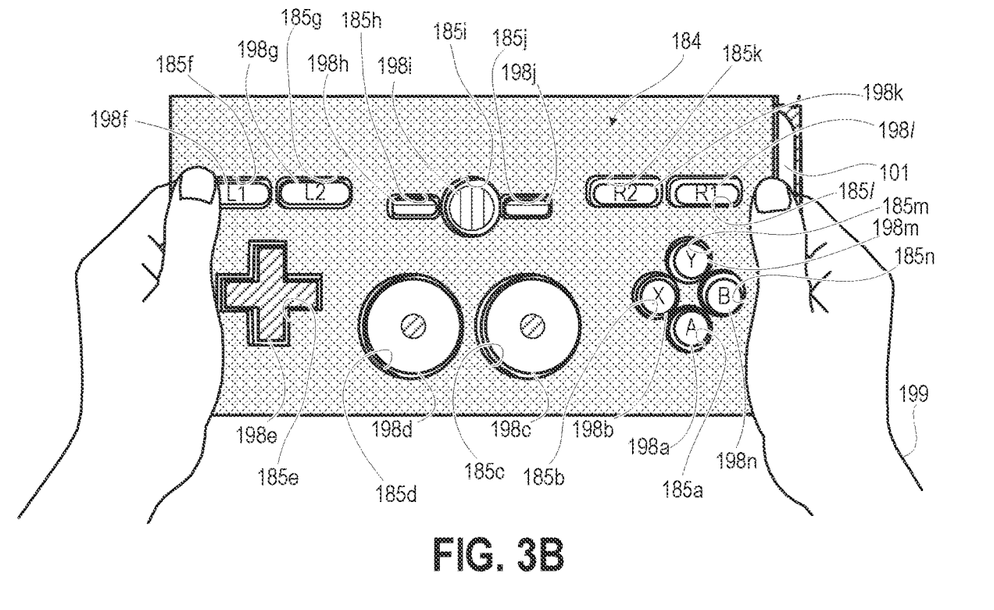
FIG. 3B depicts the communication device of FIG. 3A presenting the first virtual gamepad augmented by a first display cover that corresponds to the first virtual gamepad, according to one or more embodiments.

FIG. 3A depicts communication device 101 being held by user 199 and presenting first virtual gamepad 104 having virtual controls 198a-198n. FIG. 3B depicts communication device 101 presenting first virtual gamepad 104a (FIG. 3A) augmented by first display cover 119a that corresponds to first virtual gamepad 104a (FIG. 3A). Each virtual control 198a-198n is exposed within corresponding hole 185a-185n.

Figure 4:
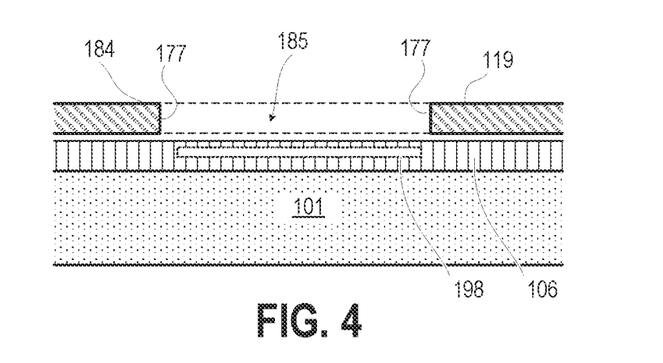
FIG. 4 depicts a side cross sectional view of the communication device and the display cover of FIG. 3B having a hole edge that presents a raised contour proximate to a virtual control presented by a touch display of the communication device, according to one or more embodiments.
Figure 5:
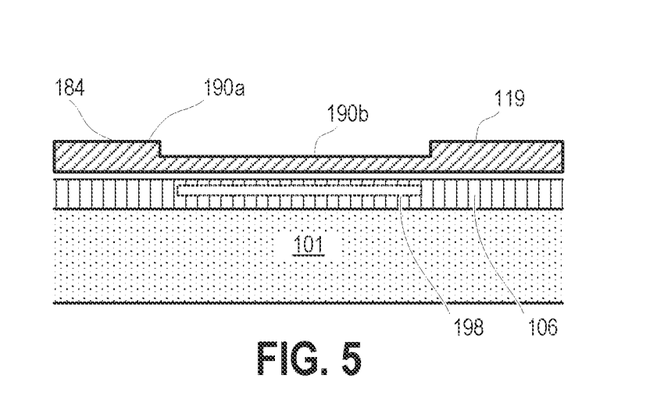
FIG. 5 depicts a side cross sectional view of the communication device and the display cover of FIG. 1 having a raised contour around a thinner cover layer over the virtual control presented by the touch display of the communication device, according to one or more embodiments.
Figure 6:
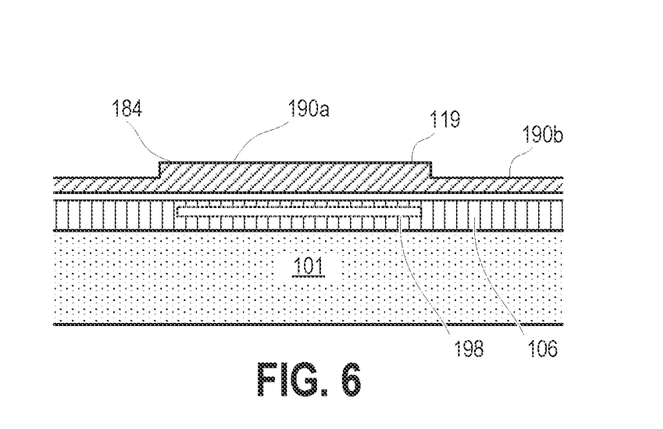
FIG. 6 depicts a side cross sectional view of the communication device and an alternate display cover of FIG. 1 having a raised contour around a thicker cover layer over the virtual control presented by the touch display of the communication device, according to one or more embodiments.

FIG. 4 depicts a side cross sectional view of communication device 101 and display cover 119 having raised contour 184 that is hole edge 177 around hole 185 presented proximate to virtual control 198 presented by touch display 106 of communication device 101. FIG. 5 depicts a side cross sectional view of communication device 101 and display cover 119a having raised contour 184 provided by thicker cover layer the presents raised area 190a around thinner cover layer that presents depressed area 190b over virtual control 198 presented by touch display 106 of communication device 101. FIG. 6 depicts a side cross sectional view of communication device 101 and alternate second display cover 119b having raised contour 184 provided by thinner cover layer that presents depressed area 190b around thicker cover layer that presents raised area 190a over virtual control 198 presented by touch display 106 of communication device 101.

Figure 7A:
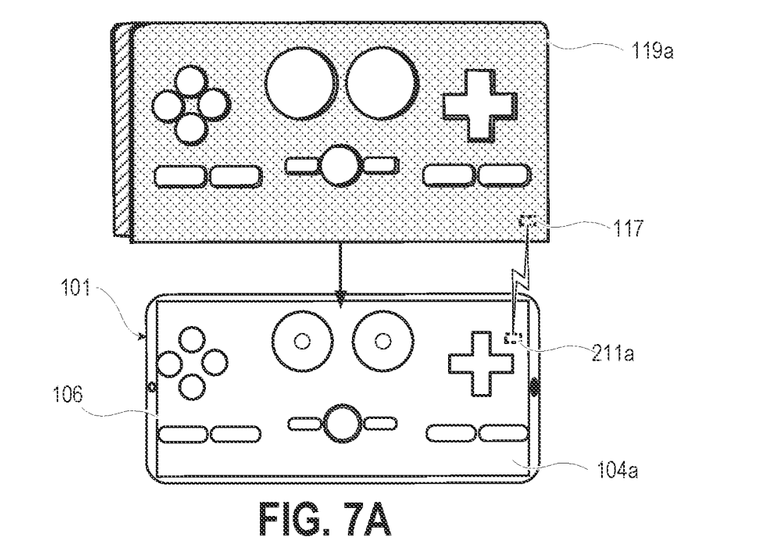
FIG. 7A depicts the communication device of FIG. 2 presenting the first virtual gamepad based on identifying orientation of a first display cover that corresponds to the first virtual gamepad, according to one or more embodiments.
Figure 7B:
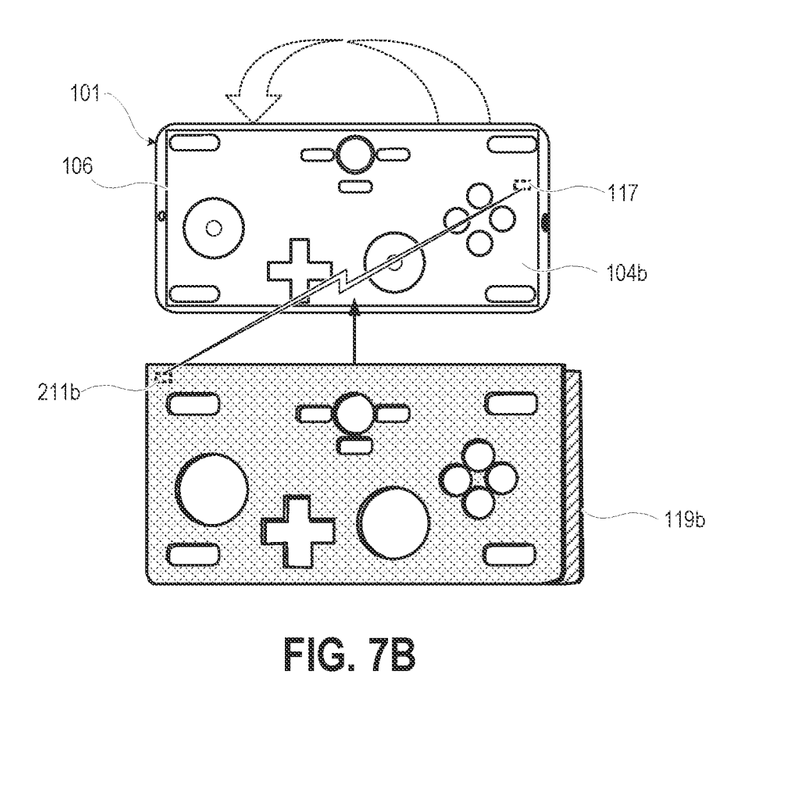
FIG. 7B depicts the communication device of FIG. 2 presenting the second virtual gamepad based on identifying orientation of a second display cover that corresponds to a second virtual gamepad, according to one or more embodiments.

FIG. 7A depicts communication device 101 presenting first virtual gamepad 104a on touch display 106 based on identifying orientation of first display cover 119a that corresponds to first virtual gamepad 104a. Communication device 101 monitors cover sensor 117 that detects presence, type, and orientation of target identification components 211a. FIG. 7B depicts communication device 101 presenting second virtual gamepad 104b on touch display 106 based on identifying orientation of second display cover 119b that corresponds to second virtual gamepad 104b. The orientation of presentation of second virtual gamepad 104b is rotated 180° as compared to presentation of first virtual gamepad 104a (FIG. 7A), corresponding to orientation of second display cover 119b.

Figure 8A:
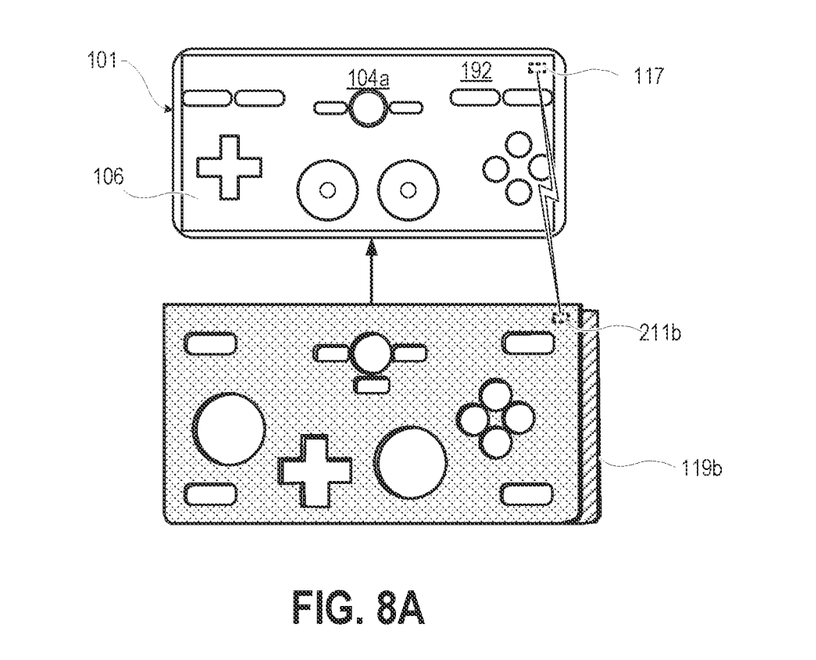
FIG. 8A depicts the communication device of FIG. 2 presenting the first virtual gamepad prior to being augmented by the second display cover that corresponds to the second virtual gamepad, according to one or more embodiments.
Figure 8B:
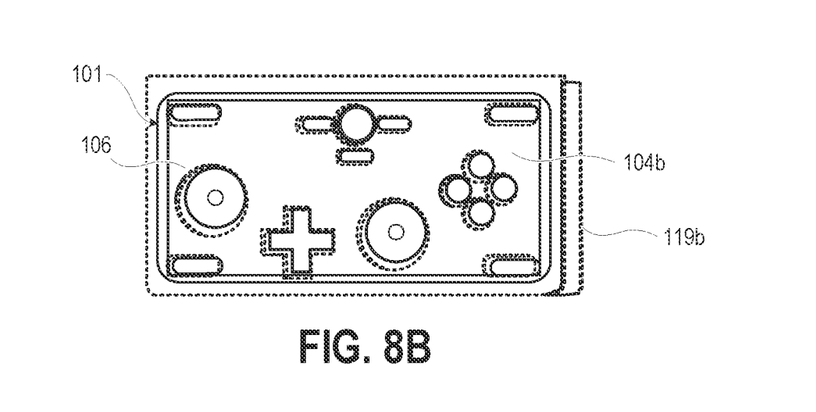
FIG. 8B depicts the communication device of FIG. 8A covered by the second display cover (shown in phantom lines) and presenting the second virtual gamepad based on identifying the type and the orientation of the second display cover that corresponds to a second virtual gamepad, according to one or more embodiments.

FIG. 8A depicts communication device 101 presenting first virtual gamepad 104a on touch display 106 prior to being augmented by second display cover 119b that corresponds to second virtual gamepad 104b. FIG. 8B depicts communication device 101 covered by second display cover 119b (shown in phantom lines) and automatically transitions to presenting on touch display 106 second virtual gamepad 104b based on identifying the type and the orientation of second display cover 119b that corresponds to second virtual gamepad 104b.

Figure 9:
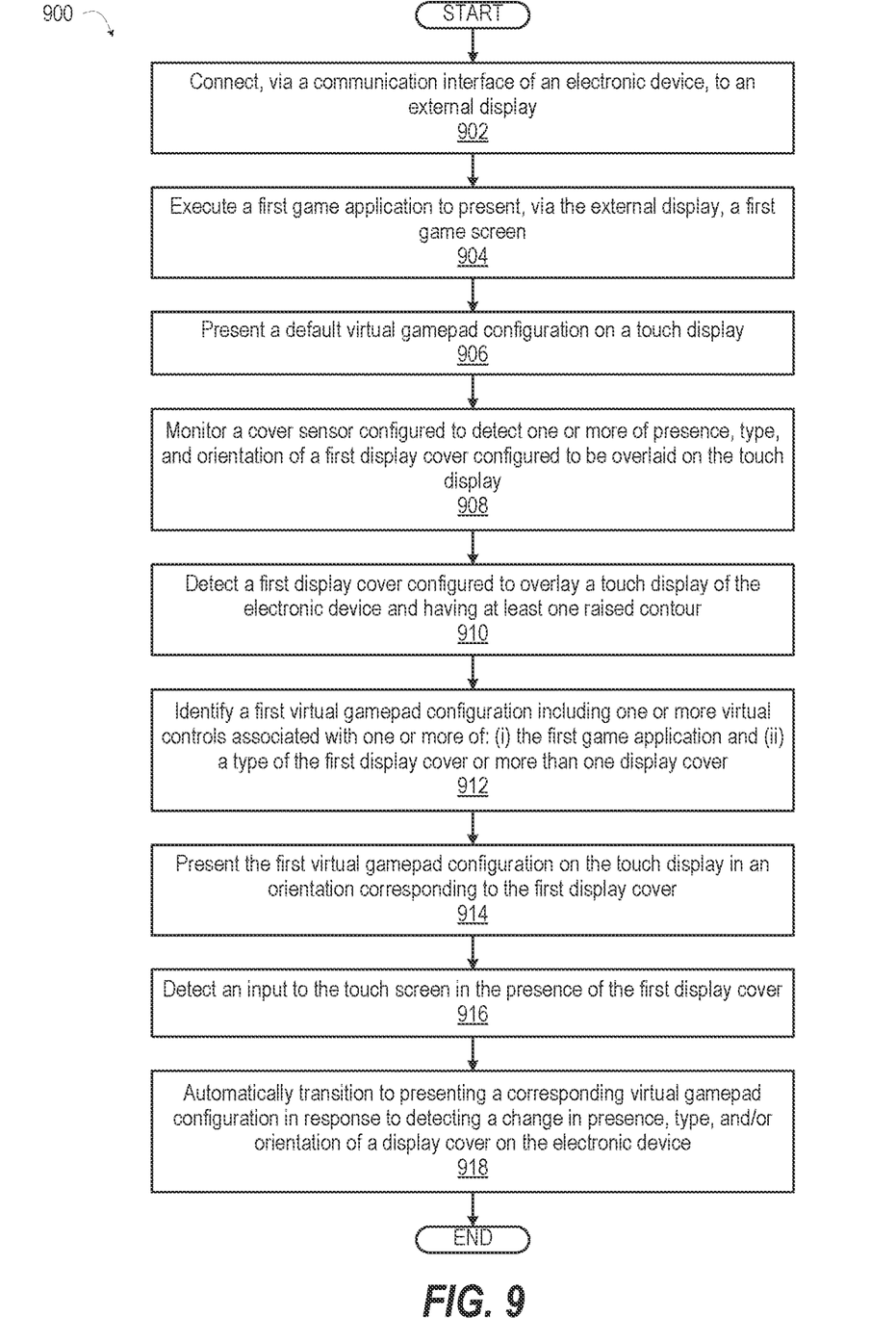
FIG. 9 is a flow diagram presenting a method of automatically identifying presence, type, and orientation of a display cover that augments a touch screen of a communication device presenting a corresponding virtual gamepad, according to one or more embodiments.

FIG. 9 is a flow diagram presenting method 900 of automatically identifying presence, type, and orientation of a display cover that augments a touch screen of an electronic device presenting a corresponding virtual gamepad, according to one or more embodiments. The description of method 900 (FIG. 9) is provided with general reference to the specific components illustrated within the preceding FIGS. 1, 2, 3A, 3B, 4-6, 7A, 7B, 8A, and 8B. Specific components referenced in method 900 (FIG. 9) may be identical or similar to components of the same name used in describing preceding FIGS. 1, 2, 3A, 3B, 4-6, 7A, 7B, 8A, and 8B. In one or more embodiments, controller 110 (FIG. 1) configures communication device 101 (FIGS. 1, 3A, 3B, 4 and 5) to provide the described functionality of method 900 (FIG. 9).

With reference to FIG. 9, method 900 includes connecting, via a communication interface of an electronic device, to an external display (block 902). Method 900 includes executing a first game application to present, via the external display, a first game screen (block 904). Method 900 includes presenting a default virtual gamepad configuration on the touch display (block 906). Method 900 includes monitoring a cover sensor configured to detect one or more of presence, type, and orientation of a first display cover configured to be overlaid on the touch display (block 908). Method 900 includes detecting a first display cover configured to overlay a touch display of the electronic device and having at least one raised contour (block 910). In one or more embodiments, method 900 includes identifying a first virtual gamepad configuration including one or more virtual controls associated with one or more of: (i) the first game application and (ii) a type of the first display cover of more than one display cover (block 912). Method 900 includes presenting the first virtual gamepad configuration on the touch display in an orientation corresponding to the first display cover (block 914). The at least one raised contour of the first display cover is positioned to provide tactile feedback to guide interaction with the at least one of the one or more virtual controls. Method 900 includes detecting an input to the touch screen in the presence of the first display cover (block 916). Method 900 includes automatically transitioning to presenting a corresponding virtual gamepad configuration in response to detecting a change in presence, type, and/or orientation of a display cover on the electronic device (block 918). Then method 900 ends.

In one or more embodiments, the first display cover is configured to one of: (i) transfer one of a manual force or a capacitive touch to the touch display. The first display cover includes a first section having a first thickness and a second section adjacent to the first section and having a second thickness that is thicker than the first thickness, a transition from the first section to the second section defining the at least one raised contour.

In one or more embodiments, the at least one raised contour of the first display cover corresponds to at least one gamepad manual control of a first physical configuration of a first game controller. In one or more embodiments, the first display cover includes at least one hole in a covering layer, presenting a corresponding exposed portion of the touch display and defining the at least one raised contour (i.e., hole edge) surrounding the at least one hole.

In one or more embodiments, method 900 includes monitoring the cover sensor to detect one lateral edge of the touch display that is generally horizontal and that is vertically higher than three other lateral edges of the touch display. Method 900 includes presenting the first virtual gamepad configuration on the touch screen oriented with an upper portion aligned with the one lateral edge.

In one or more embodiments, method 900 includes storing, in memory, a second game application associated with a second game controller. Method 900 includes executing the second game application to present, via the external display, a second game screen. Method 900 includes identifying a second virtual gamepad configuration of one or more virtual controls that corresponds to one or more gamepad manual controls in a second physical configuration of a second game controller associated with the second game application. Method 900 includes presenting the second virtual gamepad configuration on the touch display to align with at least one raised second contour of a second display cover of a set of two or more display covers. The set of two or more display covers includes the first display cover and a second display cover configured to overlay the touch display and having the at least one raised second contour that corresponds to at least one manual control of the second physical configuration of the second game controller.

In one or more particular embodiments, method 900 includes monitoring the cover sensor to detect presence and orientation of an attached one of the first display cover or the second display cover overlaid on the touch display. Method 900 includes presenting the first virtual gamepad configuration on the touch screen at least in part in response to detecting, via the cover sensor, the presence of the first display cover overlaid on the touch display. Method 900 includes presenting the second virtual gamepad configuration on the touch screen at least in part in response to detecting, via the cover sensor, the presence of the second display cover overlaid on the touch display.

Aspects of the present innovation are described above with reference to flowchart illustrations and/or block diagrams of methods, apparatus (systems) and computer program products according to embodiments of the innovation. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

As will be appreciated by one skilled in the art, embodiments of the present innovation may be embodied as a system, device, and/or method. Accordingly, embodiments of the present innovation may take the form of an entirely hardware embodiment or an embodiment combining software and hardware embodiments that may all generally be referred to herein as a "circuit," "module" or "system."

While the innovation has been described with reference to exemplary embodiments, it will be understood by those skilled in the art that various changes may be made, and equivalents may be substituted for elements thereof without departing from the scope of the innovation. In addition, many modifications may be made to adapt a particular system, device, or component thereof to the teachings of the innovation without departing from the essential scope thereof. Therefore, it is intended that the innovation not be limited to the particular embodiments disclosed for carrying out this innovation, but that the innovation will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the innovation. As used herein, the singular forms "a", "an" and "the" are intended to include the plural forms as well, unless the context clearly indicates otherwise. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present innovation has been presented for purposes of illustration and description but is not intended to be exhaustive or limited to the innovation in the form disclosed. Many modifications and variations will be apparent to those of ordinary skill in the art without departing from the scope and spirit of the innovation. The embodiments were chosen and described in order to best explain the principles of the innovation and the practical application, and to enable others of ordinary skill in the art to understand the innovation for various embodiments with various modifications as are suited to the particular use contemplated.

What is claimed is:

1. An electronic device comprising:
   a communication interface that enables the electronic device to connect to an external display;
   a touch display;
   a first display cover configured to overlay the touch display and having at least one raised contour;
   a memory storing a first game application associated with a first game controller; and
   a controller communicatively connected to the external display, the touch display, and the memory, and which:
   executes the first game application to present, via the external display, a first game screen;
   identifies a first virtual gamepad configuration comprising one or more virtual controls associated with the first game application; and
   presents the first virtual gamepad configuration on the touch display, wherein the at least one raised contour of the first display cover is positioned to provide tactile feedback to guide interaction with the at least one of the one or more virtual controls.

2. The electronic device of claim 1, wherein the at least one raised contour of the first display cover corresponds to at least one gamepad manual control of a first physical configuration of a first game controller.

3. The electronic device of claim 1, wherein the first display cover comprises at least one hole in a covering layer, presenting an exposed portion of the touch display exposed by the at least one hole defining the at least one raised contour surrounding the at least one hole.

4. The electronic device of claim 1, wherein:
   the first display cover is configured to transfer one of a manual force or a capacitive touch to the touch display; and
   the first display cover comprises a first section having a first thickness and a second section adjacent to the first section and having a second thickness that is thicker than the first thickness, a transition from the first section to the second section defining the at least one raised contour.

5. The electronic device of claim 1, further comprising a cover sensor communicatively connected to the controller that:
   detects one lateral edge of the touch display that is generally horizontal and that is vertically higher than three other lateral edges of the touch display; and
   presents the first virtual gamepad configuration on the touch screen oriented with an upper portion aligned with the one lateral edge.

6. The electronic device of claim 1, further comprising a cover sensor communicatively connect to the controller and configured to detect presence and orientation of the first display cover overlaid on the touch display, wherein:
   the first display cover is configured to be positioned in at least two orientations on the touch display; and
   the controller:
      detects, via the cover sensor, the presence and the orientation of the first display cover overlaid on the touch display; and
      presents the first virtual gamepad configuration on the touch screen in the orientation of the first display cover.

7. The electronic device of claim 6, wherein the controller identifies the first virtual gamepad configuration based on identifying the first display cover.

8. The electronic device of claim 1, further comprising:
   a set of two or more display covers comprising the first display cover and a second display cover configured to overlay the touch display and having at least one raised second contour that corresponds to at least one manual control of a second physical configuration of a second game controller;
   the memory storing a second game application associated with the second game controller; and
   the controller:
      executes the second game application to present, via the external display, a second game screen;
      identifies a second virtual gamepad configuration of one or more virtual controls that corresponds to the one or more gamepad manual controls in the second physical configuration of the second game controller associated with the second game application; and
      presents the second virtual gamepad configuration on the touch display to align with the at least one raised second contour of the second display cover.

9. The electronic device of claim 8, further comprising a cover sensor communicatively connect to the controller and configured to detect presence and orientation of an attached one of the first display cover or the second display cover overlaid on the touch display, wherein:
   the controller:
      presents the first virtual gamepad configuration on the touch screen at least in part in response to detecting, via the cover sensor, the presence of the first display cover overlaid on the touch display; and
      presents the second virtual gamepad configuration on the touch screen at least in part in response to detecting, via the cover sensor, the presence of the second display cover overlaid on the touch display.

10. A method comprising:
   connecting, via a communication interface of an electronic device, to an external display;
   executing a first game application to present, via the external display, a first game screen;
   detecting a first display cover configured to overlay a touch display of the electronic device and having at least one raised contour;
   identifying a first virtual gamepad configuration comprising one or more virtual controls associated with the first game application; and
   presenting the first virtual gamepad configuration on the touch display, wherein the at least one raised contour of the first display cover is positioned to provide tactile feedback to guide interaction with the at least one of the one or more virtual controls, wherein at least one of identification and orientation of the first virtual gamepad configuration is based at least in part on detecting the first display cover.

11. The method of claim 10, wherein the at least one raised contour of the first display cover corresponds to at least one gamepad manual control of a first physical configuration of a first game controller.

12. The method of claim 10, wherein the first display cover comprises at least one hole in a covering layer, presenting a corresponding exposed portion of the touch display and defining the at least one raised contour surrounding the at least one hole.

13. The method of claim 10, further comprising detecting an input to the touch screen, wherein:
   the first display cover is configured to transfer one of a manual force or a capacitive touch to the touch display; and
   the first display cover comprises a first section having a first thickness and a second section adjacent to the first section and having a second thickness that is thicker than the first thickness, a transition from the first section to the second section defining the at least one raised contour.

14. The method of claim 10, further comprising:
   monitoring a cover sensor to detect one lateral edge of the touch display that is generally horizontal and that is vertically higher than three other lateral edges of the touch display; and
   presenting the first virtual gamepad configuration on the touch screen oriented with an upper portion aligned with the one lateral edge.

15. The method of claim 10, further comprising:
   monitoring a cover sensor to detect presence and orientation of the first display cover overlaid on the touch display, wherein the first display cover is configured to be positioned in at least two orientations on the touch display;
   detecting, via the cover sensor, the presence and the orientation of the first display cover overlaid on the touch display; and
   presenting the first virtual gamepad configuration on the touch screen in the orientation of the first display cover.

16. The method of claim 15, further comprising identifying the first virtual gamepad configuration based on identifying the first display cover.

17. The method of claim 10, further comprising:
   storing, in memory, a second game application associated with a second game controller;
   executing the second game application to present, via the external display, a second game screen;
   identifying a second virtual gamepad configuration of one or more virtual controls that corresponds to one or more gamepad manual controls in a second physical configuration of a second game controller associated with the second game application; and
   presenting the second virtual gamepad configuration on the touch display to align with a at least one raised second contour of a second display cover of a set of two or more display covers comprising the first display cover and a second display cover configured to overlay the touch display and having the at least one raised second contour that corresponds to at least one manual control of the second physical configuration of the second game controller.

18. The method of claim 17, further comprising:
monitoring a cover sensor to detect presence and orientation of an attached one of the first display cover or the second display cover overlaid on the touch display;
presenting the first virtual gamepad configuration on the touch screen at least in part in response to detecting, via the cover sensor, the presence of the first display cover overlaid on the touch display; and
presenting the second virtual gamepad configuration on the touch screen at least in part in response to detecting, via the cover sensor, the presence of the second display cover overlaid on the touch display.

19. A computer program product comprising:
a computer readable storage device; and
program code on the computer readable storage device that when executed by a processor associated with an electronic device, the program code enables the electronic device to provide functionality of:
connecting, via a communication interface of the electronic device, to an external display;
executing a first game application to present, via the external display, a first game screen;
detecting a first display cover configured to overlay a touch display of the electronic device and having at least one raised contour;
identifying a first virtual gamepad configuration comprising one or more virtual controls associated with the first game application; and
presenting the first virtual gamepad configuration on the touch display, wherein the at least one raised contour of the first display cover is positioned to provide tactile feedback to guide interaction with the at least one of the one or more virtual controls, wherein at least one of identification and orientation of the first virtual gamepad configuration is based at least in part on detecting the first display cover.

20. The computer program product of claim 19, wherein the program code enables the electronic device to provide functionality of:
monitoring a cover sensor to detect presence and orientation of the first display cover overlaid on the touch display, wherein the first display cover is configured to be positioned in at least two orientations on the touch display;
detecting, via the cover sensor, the presence and the orientation of the first display cover overlaid on the touch display; and
presenting the first virtual gamepad configuration on the touch screen in the orientation of the first display cover.

* * * * *